United States Patent
Jose et al.

(10) Patent No.: US 10,129,082 B2
(45) Date of Patent: Nov. 13, 2018

(54) SYSTEM AND METHOD FOR DETERMINING A MASTER REMOTE ACCESS CONTROLLER IN AN INFORMATION HANDLING SYSTEM

(71) Applicant: DELL PRODUCTS, L.P., Round Rock, TX (US)

(72) Inventors: Cyril Jose, Austin, TX (US); Marshal F. Savage, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 376 days.

(21) Appl. No.: 14/860,735

(22) Filed: Sep. 22, 2015

(65) Prior Publication Data

US 2017/0085418 A1    Mar. 23, 2017

(51) Int. Cl.
*H04L 12/24*    (2006.01)

(52) U.S. Cl.
CPC ........ *H04L 41/082* (2013.01); *H04L 41/0853* (2013.01); *H04L 41/12* (2013.01)

(58) Field of Classification Search
CPC ...... H04W 4/008; H04W 84/20; H04W 16/14
See application file for complete search history.

(56) References Cited

U.S. PATENT DOCUMENTS

| | | |
|---|---|---|
| 2002/0099972 A1 | 7/2002 | Walsh et al. |
| 2006/0092853 A1* | 5/2006 | Santoso ............... H04L 45/583 370/252 |
| 2010/0142402 A1 | 6/2010 | Boldyrev et al. |
| 2013/0058348 A1 | 3/2013 | Koponen et al. |
| 2014/0269295 A1 | 9/2014 | Anumala |
| 2017/0013579 A1* | 1/2017 | Stacey .............. H04W 56/0015 |

* cited by examiner

*Primary Examiner* — Chirag R Patel
(74) *Attorney, Agent, or Firm* — Isidore PLLC

(57) ABSTRACT

A method and information handling system (IHS) determines a master remote access controller (RAC) in a distributed IHS having multiple communicatively-connected computing nodes with corresponding RACs. The method includes transmitting a first set of RAC parameters from a first RAC to several other RACs. The first set of RAC parameters includes a locality of reference (LOR) value for the first RAC. Several other sets of RAC parameters are received from the other RACs. A first list of all of the RACs is generated including the associated LOR values. The first list is sorted based on the LOR values and the RAC having the highest LOR value in the first list is designated as a first master RAC candidate.

18 Claims, 7 Drawing Sheets

SYSTEM AND METHOD FOR DETERMINING A MASTER REMOTE ACCESS CONTROLLER IN AN INFORMATION HANDLING SYSTEM

BACKGROUND

1. Technical Field

The present disclosure generally relates to information handling systems and in particular to a system and a method for determining a master remote access controller in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

The information handling system can be a distributed information handling system, which includes several groups of computers, servers or computing nodes in a computer network that are in communication with each other over a communications network which allows the computers in the network to exchange data and information. It is desirable for a system administrator of the distributed information handling system to be able to remotely manage various functions of the distributed information handling system. For example, the system administrator may need to remotely access an individual computer or server to perform a remote reboot, a shutdown, a power on, or to monitor hardware sensors such as fan speed and power voltages. A remote management system can also allow remote installation of an operating system and also allow adjustment of BIOS settings that may not be accessible after the operating system has already booted. In some computer networks, each computer in the network can include a remote management system. The remote management system allows management and monitoring of computers in the network from any computer of the system administrators choice.

Because each of the computers in the network includes a remote management system, various conflicts can arise between the several remote management systems when the system administrator uses the remote management systems to perform remote access and out of band management functions.

BRIEF SUMMARY

Disclosed are a method and an information handling system (IHS) for determining a master remote access controller (RAC) in a distributed IHS having multiple communicatively-interconnected computing nodes.

According to one embodiment, the computer-implemented method for determining a master RAC in an IHS includes transmitting a first set of RAC parameters from a first RAC to several other RACs, each associated with a different one of the interconnected computing nodes. The first set of RAC parameters include a locality of reference (LOR) value for the first RAC. Several other sets of RAC parameters are received from the other RACs. A first list of all of the RACs is generated, including the associated LOR values. The first list is sorted based on the LOR values, and the RAC having the highest LOR value in the first list is designated as a first master RAC candidate.

According to another embodiment, an IHS includes a processor, a first RAC communicatively coupled to the processor, and a memory device communicatively coupled to the first RAC. The first RAC includes firmware executing thereon to determine a master RAC. The firmware configures the first RAC to transmit a first set of RAC parameters from the first RAC to several other RACs of second computing nodes that are communicatively connected to the IHS within a RAC-managed distributed IHS. The RAC parameters include a locality of reference (LOR) value for the first RAC. Several other sets of RAC parameters are received from the other RACs. A first list of all of the RACs is generated including the associated LOR values. The first list is sorted based on the LOR values and the RAC having the highest LOR value in the first list is designated as a first master RAC candidate.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system (IHS) for determining a master RAC in an IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
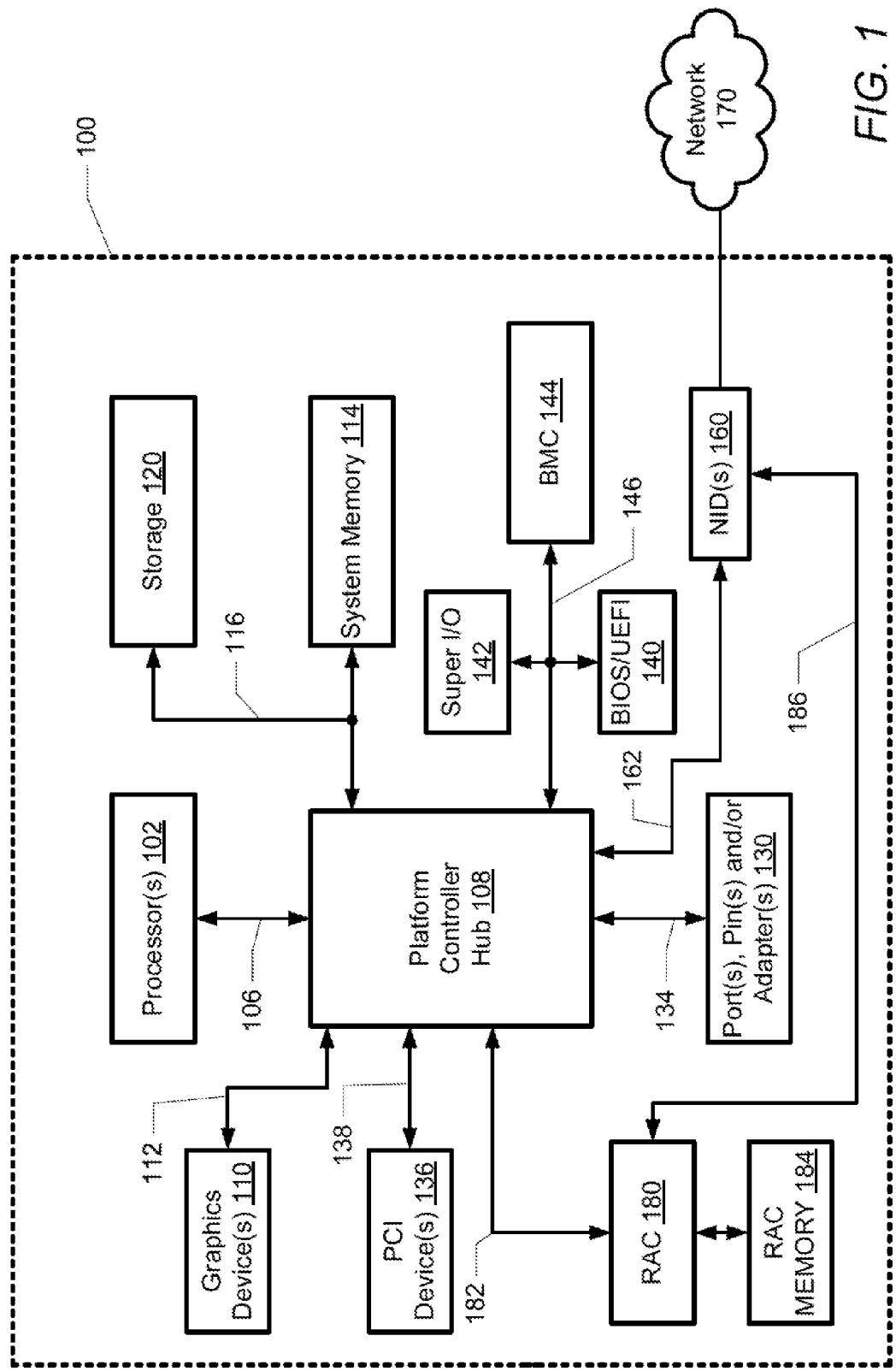
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 may include any processor capable of executing program instructions. In an embodiment, a motherboard is provided, configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via a graphics bus 112 (e.g., an Accelerated Graphics Port or AGP bus, a Peripheral Component Interconnect (PCI) bus, etc.). PCH 108 is also coupled to system memory 114 via memory bus 116. Memory 114 may be configured to store program instructions and/or data accessible by processor(s) 102. In various embodiments, memory 114 may be implemented using any suitable memory technology, such as static RAM (SRAM), synchronous dynamic RAM (SDRAM), nonvolatile/Flash-type memory, or any other type of memory.

Also coupled to memory bus 116 is a storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100. PCH 108 is also coupled to one or more PCI devices 136 (e.g., modems, network cards, sound cards, video cards, shared memory etc.) via a PCI bus 138.

PCH 108 is further coupled to port(s), pin(s), and/or adapter(s) 130 over a bus 134. Generally, PCH 108 may be configured to handle various I/O operations, and PCH 108 may provide interfaces such as, for instance, Universal Serial Bus (USB), audio, serial, parallel, Ethernet, etc., via port(s), pin(s), and/or adapter(s) 130 over bus 134. For example, PCH 108 may be configured to allow data to be exchanged between IHS 100 and other devices, such as other IHSs attached to a network. In various embodiments, PCH 108 may support communication via wired or wireless general data networks, such as any suitable type of Ethernet network, via telecommunications/telephony networks, such as analog voice networks or digital fiber communications networks, via storage area networks such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is also coupled to basic input output system/unified extensible firmware interface (BIOS/UEFI) 140, super I/O Controller 142, and baseboard management controller (BMC) 144 via Low Pin Count (LPC) bus 146.

BIOS/UEFI 140 includes non-volatile memory having program instructions stored thereon. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

BMC 144 may include non-volatile memory having program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the BIOS' firmware interface to initialize and test components of IHS 100. BMC 144 can further include BMC firmware 145 that is used by BMC 144 as part of the identification of communication threats in IHS 100. Super I/O Controller 142 combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from memory 110. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108.

IHS 100 further comprises one or more network interface devices (NID(s)) 160 coupled to PCH 108 via a PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

Figure 2:
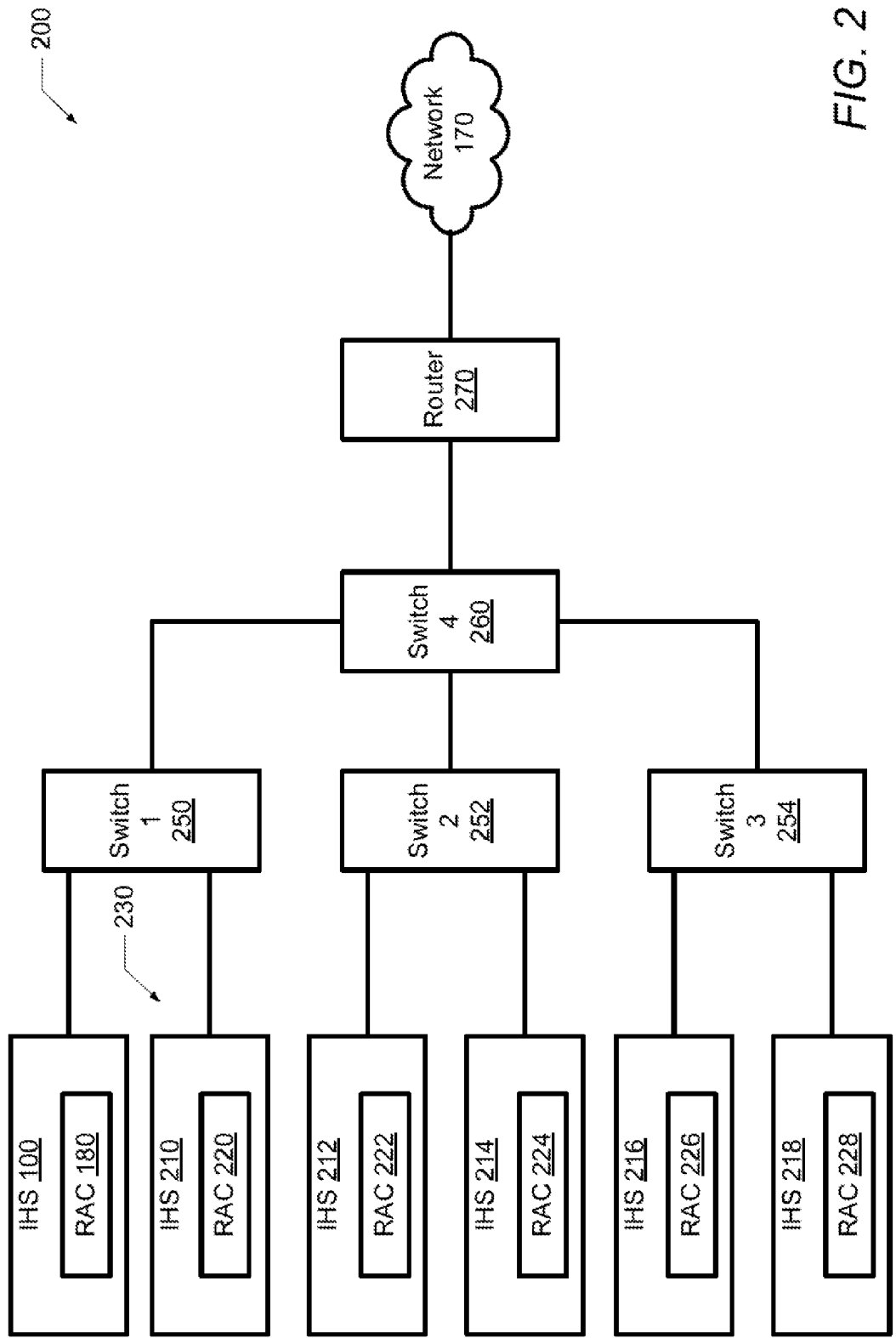
FIG. 2 illustrates an example networked computing environment, including multiple IHSs, switches and a router in communication with/via a network, according to one or more embodiments.

Referring to FIG. 2, a distributed networked computing environment or system 200 is shown. In the description of the following figures, reference is also made to specific components illustrated within each of the preceding figures. Networked computing system 200 includes other distributed computing devices or systems such as IHSs 210, 212, 214, 216 and 218. Each IHS includes a corresponding individual RAC. IHS 100 has RAC 180. IHS 210 has RAC 220. IHS 212 has RAC 222. IHS 214 has RAC 224. IHS 216 has RAC 226 and IHS 218 has RAC 228. RACs 180-228 form a group of RACs 230.

IHS 100 and 210 are communicatively coupled to switch 1 250. IHS 212 and 214 are communicatively coupled to switch 2 252. IHS 216 and 218 are communicatively coupled to switch 3 254. Switch 1 250, switch 2 252 and switch 3 254 are communicatively coupled to switch 4 260. Switch 4 260 is communicatively coupled to router 270. Router 270 is communicatively coupled to network 170. Switches 250-260 are devices that connect IHSs together on a computer network using packet switching to receive, process and forward data from an originating device to the destination device. Router 270 is a networking device that forwards data packets between computer networks.

In one embodiment, IHSs 210-218 can be located in the same data center as IHS 100. In another embodiment, IHSs 210-218 can be located in a plurality of (various) different physical locations. In another embodiment, networked computing system 200 can also include secondary servers and blades.

Figure 3:
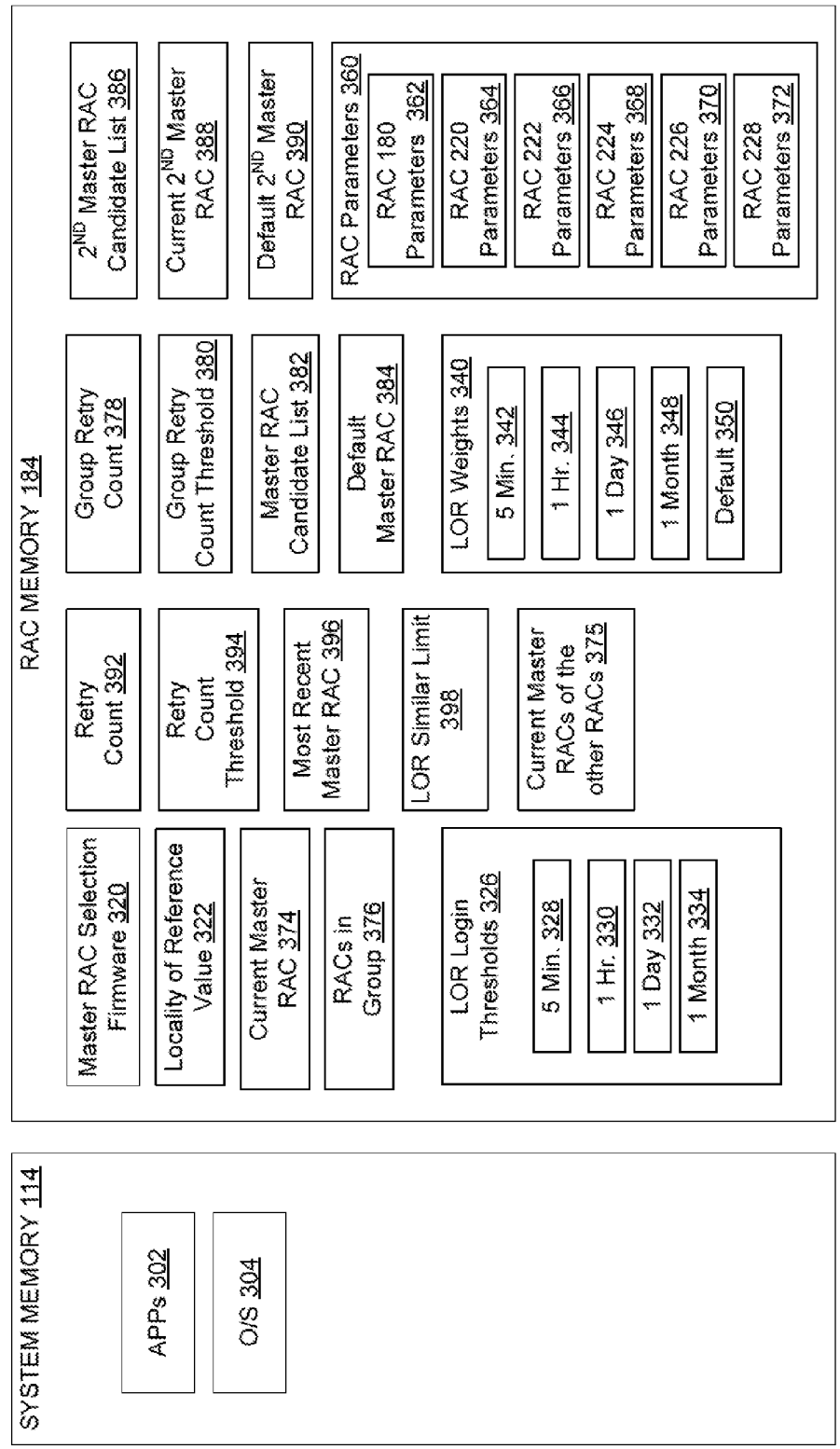
FIG. 3A illustrates example contents of a system memory in a first IHS, in accordance with one embodiment.
FIG. 3B illustrates example contents of a remote access controller (RAC) memory that includes firmware for determining a master RAC, in accordance with one embodiment.

With reference now to FIG. 3A, one embodiment of example contents of system memory 114 of IHS 100 is shown. System memory 114 includes data, software, and/or firmware modules including application(s) 302, and operating system (O/S) 304. System memory 114 can also include other data, software, and/or firmware modules.

Turning to FIG. 3B, one embodiment of example contents of RAC memory 184 of IHS 100 is shown. RAC memory 184 includes master RAC selection firmware module 320 that enables determining an elected primary or master RAC from among the multiple RACs in networked computing system 200. Each of the RACs 180-228 includes a RAC memory that stores master RAC selection firmware module 320. Master RAC selection firmware module 320 is a software and/or firmware module that executes on each of the RACs 180-228 to facilitate determining a primary or master RAC for networked computing system 200.

RAC memory 184 further includes a current locality of reference value (LOR) 322, LOR login thresholds 326 and LOR weights 328. LOR value 322 is a measure of the frequency of a user access or login to a specific RAC, in this case for RAC 180. The access includes both user access through a graphical user interface (GUI) and/or command line interface. LOR login thresholds 326 are a threshold number of logins to a RAC within a specific time period. As illustrated, 5 minute threshold 328 is the threshold number of logins to RAC 180 within the last 5 minutes, 1 hour minute threshold 330 is the threshold number of logins to RAC 180 within the last 1 hour. As further illustrated, 1 day threshold 332 is the threshold number of logins to RAC 180 within the last 1 day, and 1 month threshold 334 is the threshold number of logins to RAC 180 within the last 1 month.

LOR weights 340 are the values assigned to be added to LOR value 322 for each login to a RAC in a specific time period. As illustrated, 5 minute weight 342 is the value assigned to be added to LOR value 322 if the number of logins in the last 5 minutes exceeds the 5 minute threshold number of logins 328. Also, 1 hour weight 344 is the value assigned to be added to LOR value 322 if the number of logins in the last 1 hour exceeds the 1 hour threshold number of logins 330. Additionally, 1 day weight 346 is the value assigned to be added to LOR value 322 if the number of logins in the last 1 day exceeds the 1 day threshold number of logins 332. Finally, 1 month weight 348 is the value assigned to be added to LOR value 322 if the number of logins in the last 1 month exceeds the 1 month threshold number of logins 334. Default weight 350 is the value assigned to be added to LOR value 322 if the most recent login is greater than 1 month.

RAC memory 184 also contains RAC parameters 360 for each RAC within a group of RACs. RAC parameters 360 include a RAC identifier, a LOR value, a firmware revision level, an IHS operational condition indicator, and a ping response time associated with each RAC. RAC parameters 360 include RAC 180 parameters 362, RAC 220 parameters 364, RAC 222 parameters 366, RAC 224 parameters 368, RAC 226 parameters 370 and RAC 228 parameters 372.

RAC memory 184 further contains the current master RAC 374, the identity of the proposed potential master RACs 375 of the other RACs 220-228. the RACs in each group of IHSs 376, the group retry count 378, the group retry count threshold 380, the master RAC candidate list 382, the default master RAC 384, the retry count 392 and the retry count threshold 394, the most recent master RAC 396 and the LOR similarity limit 398. The current master RAC 374 is the current elected or designated master RAC. The identity of the current master RACs 375 of the other RACs 220-228 is the master RAC of each of the other RACs 220-228. The RACs in each group of IHSs 376 is all of the RACs in a group of IHSs. The group retry count 378 is the current value of the number of times that electing a master RAC has been attempted for group of RACs 230. The group retry count threshold 380 is the maximum number of times that the master RAC election procedure is carried out back to back with all of the RACs 230 participating. The master RAC candidate list 382 contains all the master RAC candidates received from the other RACs and selected by RAC 180. The default master RAC 384 is the RAC selected to be the master RAC if a master RAC cannot be elected by all of the RACs. The retry count 392 is the current value of the number of times that determining a master RAC by a single RAC (i.e. RAC 180) has been attempted.

The retry count threshold 394 is the maximum number of times that is allowed locally for each RAC to determine the master RAC candidate before each RAC transmits the master RAC candidate. The most recent master RAC 396 is one of the RACs 180-228 that was most recently the current master RAC. The LOR similarity limit 398 is a pre-determined minimum difference between LOR values at the top of secondary master RAC candidate list 386. If several RACs have a similar LOR value as determined by LOR similarity limit 398 in secondary master RAC candidate list 386, then a ping response time can be used to select the secondary master RAC. In one embodiment, the master RAC from within the secondary master RAC candidate list 386 that has the lowest ping response time is selected as the secondary master RAC. The secondary master RAC candidate list 386 contains all of the secondary master RAC candidates received from the other RACs The secondary master RAC is determined by the primary master RAC (e.g., RAC 180) once the primary master RAC is elected. In one embodiment, the primary master RAC may utilize the information received as part of primary election procedure from the other RACs to complete this secondary master RAC election. If the information is not already available within the elected primary master RAC, the primary master RAC requests and collects the required information/parameters from the other RACs. The secondary master RAC candidate list 386 is only stored by the selected master RAC (i.e., RAC 180). RAC memory 184 additionally contains a current secondary master RAC 388 and a default secondary master RAC 390. The current secondary master RAC 388 is the RAC that is currently selected as the secondary master RAC. The default secondary master RAC 390 is the RAC selected to be the secondary master RAC if a secondary master RAC cannot be selected by the primary master RAC 180.

In one embodiment, RAC 180 executes master RAC selection firmware 320 to determine a master RAC from among the RACs in group of RACs 230. The firmware 320 configures RAC 180 to transmit a set of RAC parameters 362 from RAC 180 to the other RACs 220-228. The set of RAC parameters 362 includes a LOR value 322 for RAC 180. RAC parameters 364-372 are received by RAC 180 from the other RACs 220-228. A list 382 of all of the master RAC candidates is generated including the associated LOR values for each RAC. The master RAC candidate list 382 is sorted based on the LOR values, and the RAC having the highest LOR value is designated as a first master RAC candidate.

FIGS. 4, 5A, 5B and 6 illustrate flowcharts of exemplary methods 400, 500 and 600 by which RAC 180 within the preceding figures performs different aspects of the processes that enable the one or more embodiments of the disclosure. Generally, method 400 represents a computer-implemented method for determining a locality of reference value for a RAC. Method 500 represents a computer-implemented method for determining an elected master RAC. Method 600 represents a computer-implemented method for determining a secondary master RAC. The description of methods 400, 500 and 600 is provided with general reference to the specific components illustrated within the preceding FIGS. 1-3B. Generally, methods 400, 500 and 600 are described as being implemented via RAC 180 and particularly the execution of code provided by master RAC selection firmware 320 acting within RAC 180. It is however appreciated that certain aspects of the described methods may be implemented via other processing devices and/or execution of other code.

Figure 4:
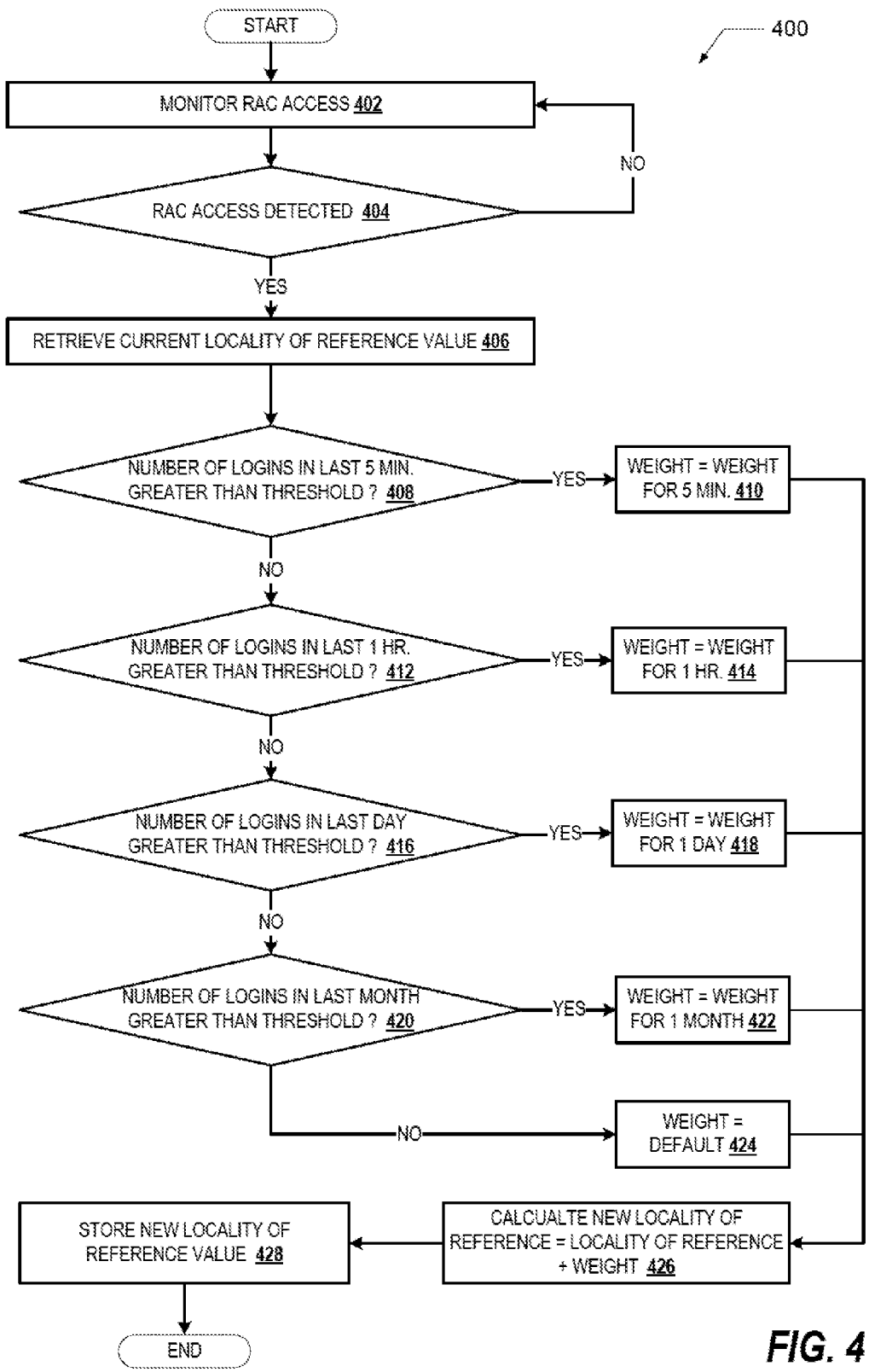
FIG. 4 is a flow chart illustrating one example of a method for determining a locality of reference value for a RAC.

Referring to the flow chart of FIG. 4, method 400 begins at the start block and proceeds to block 402 where RAC 180 monitors whether a user has logged in or accessed RAC 180. RAC 180 determines if a user access to RAC 180 has been detected (decision block 404). In response to a user access to RAC 180 not being detected, RAC 180 continues to monitor for user access at block 402. In response to a user access to RAC 180 being detected, RAC 180 retrieves current LOR value 322 from RAC memory 184 (block 406).

RAC 180 determines if the number of user logins to RAC 180 in the last 5 minutes is greater than 5 minute number of logins threshold 328 (decision block 408). In response to the number of user logins to RAC 180 in the last 5 minutes being greater than 5 minute number of logins threshold 328, RAC 180 assigns the 5 minute weight 342 value (block 410), calculates a new LOR value based on the current LOR value 322 and the 5 minute weight value 342 (block 426) and stores the new LOR value as the current LOR value 322 to RAC memory 184 (block 428). In response to the number of user logins to RAC 180 in the last 5 minutes not being greater than 5 minute number of logins threshold 328, RAC 180 determines if the number of user logins to RAC 180 in the last 1 hour is greater than 1 hour number of logins threshold 330 (decision block 412). In response to the number of user logins to RAC 180 in the last 1 hour being greater than 1 hour number of logins threshold 330, RAC 180 assigns the 1 hour weight value 344 (block 414), calculates a new LOR value based on the current LOR value 322 and the 1 hour weight value 344 (block 426) and stores the new LOR value as the current LOR value 322 to RAC memory 184 (block 428).

In response to the number of user logins to RAC 180 in the last 1 hour not being greater than 1 hour number of logins threshold 330, RAC 180 determines if the number of user logins to RAC 180 in the last 1 day is greater than 1 day number of logins threshold 332 (decision block 416). In response to the number of user logins to RAC 180 in the last 1 day being greater than 1 day number of logins threshold 332, RAC 180 assigns the 1 day weight value 346 (block 418), calculates a new LOR value based on the current LOR value 322 and the 1 day weight value 346 (block 426) and stores the new LOR value as the current LOR value 322 to RAC memory 184 (block 428).

In response to the number of user logins to RAC 180 in the last 1 day not being greater than 1 day number of logins threshold 332, RAC 180 determines if the number of user logins to RAC 180 in the last 1 month is greater than 1 month number of logins threshold 334 (decision block 420). In response to the number of user logins to RAC 180 in the last 1 month being greater than 1 month number of logins threshold 334, RAC 180 assigns the 1 month weight value 348 (block 422), calculates a new LOR value based on the current LOR value 322 and the 1 month weight value 348 (block 426) and stores the new LOR value as the current LOR value 322 to RAC memory 184 (block 428). In response to the number of user logins to RAC 180 in the last 1 month not being greater than 1 month number of logins threshold 334, RAC 180 assigns a default weight value 350 (block 424), calculates a new LOR value based on the current LOR value 322 and the default weight value 350 (block 426) and stores the new LOR value as the current LOR value 322 to RAC memory 184 (block 428). Method 400 then ends.

Figure 5A:
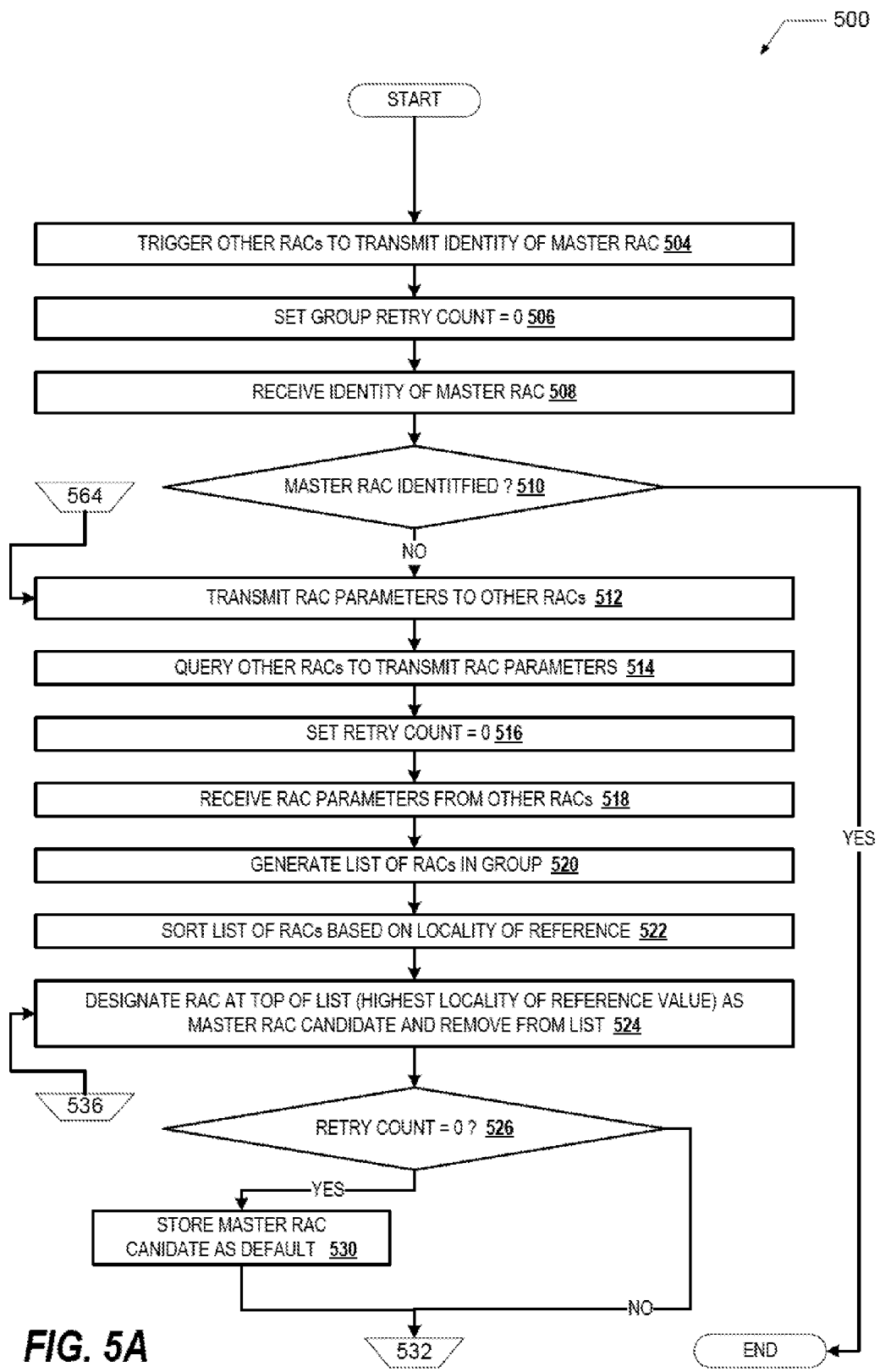
FIGS. 5A-B are a flow chart illustrating one example of a method for determining an elected master RAC.
Figure 5B:
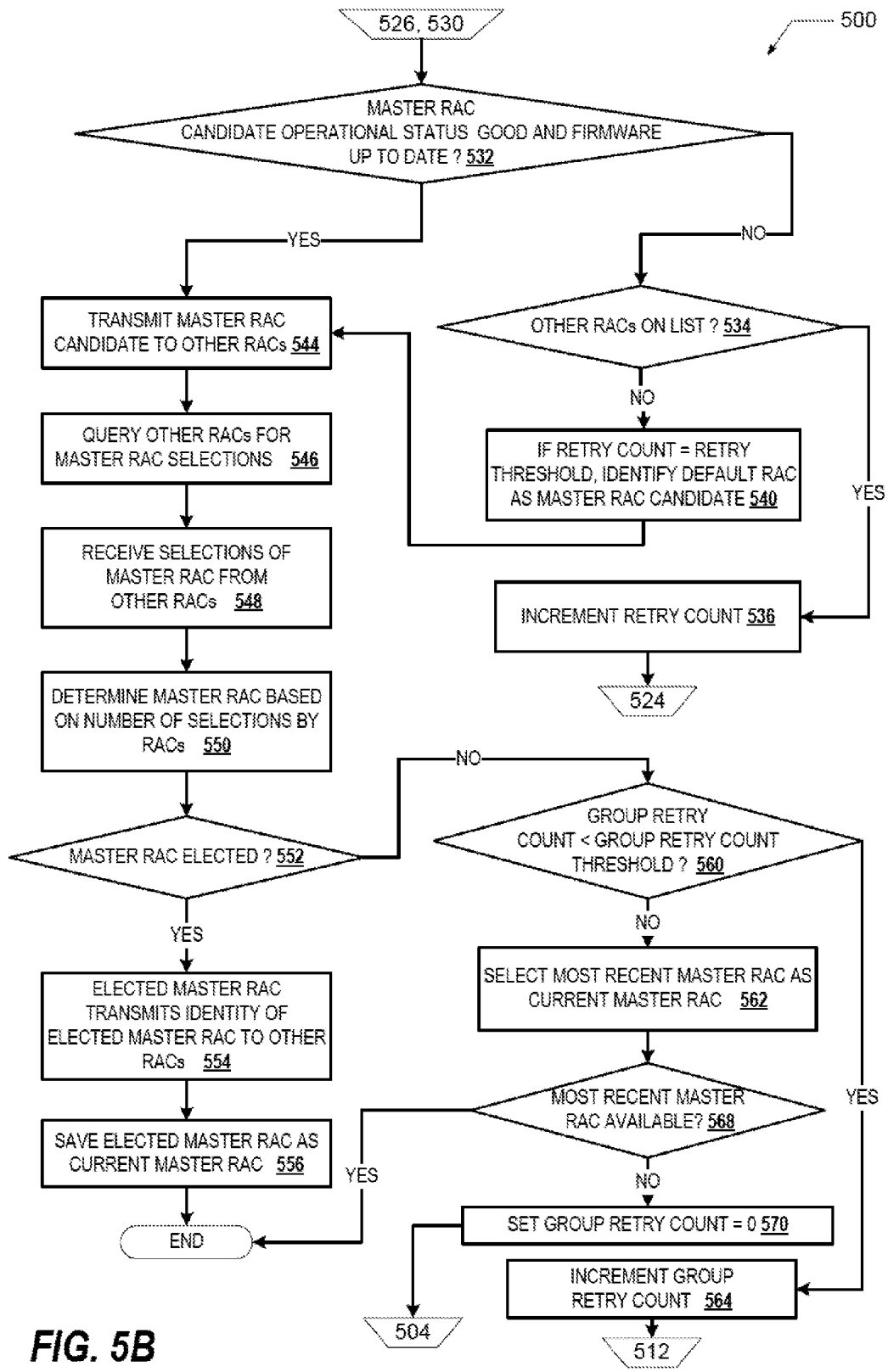

FIGS. 5A and 5B illustrate a method 500 for determining an elected master RAC. Method 500 is illustrated as being performed by a single RAC 180; however in one embodiment, each distributed RAC within group 230 can execute method 500. Referring to the flow chart of FIG. 5A, method 500 begins at the start block and proceeds to decision block 504 where RAC 180 triggers the other RACs in group 230 to transmit the identity of their current master RAC to RAC 180 (block 504). RAC 180 sets group retry count 378 equal to zero (block 506) and receives the identity of the current master RACs 375 from the other RACs 220-228 (block 508).

At decision block 510, RAC 180 determines if a current master RAC has been identified from among the master RACs received from the other RACs 220-228. In one embodiment, the current master RAC can be identified by the RAC with the most number of received master RAC identities from the other RACs. In another embodiment, when there is an existing master rack, the existing master RAC responds to the request directly, providing RAC 180 with the master RAC identification. In response to determining that a current master RAC has been identified, method 500 ends. In response to determining that a current master RAC has not been identified, RAC 180 triggers a group wide election procedure and transmits RAC 180 parameters 362 from RAC 180 to the other RACs 220-228 (block 512). RAC parameters 362 include LOR value 322 for RAC 180. RAC 180 queries the other RACs to transmit RAC parameters 364-372 from the other RACs 220-228 (block 514). RAC 180 sets retry count 392 equal to zero (block 516) and receives RAC parameters 364-372 from the other RACs (block 518).

RAC 180 generates master RAC candidate list 382 of all of the RACs in group 230 including the LOR value associated with each RAC (block 520). RAC 180 sorts the master RAC candidate list 382 based on the LOR values at block 522. The RAC having the highest LOR value in the master RAC candidate list 382 is designated as a first master RAC candidate and is removed from master RAC candidate list 382 (block 524).

At decision block 526, RAC 180 determines if the retry count 392 is equal to zero. In response to the retry count 392 being equal to zero, RAC 180 stores the first master RAC candidate as the default master RAC 384 (block 530).

Turning now to FIG. 5B, after block 530 and in response to the retry count 392 not being equal to zero, RAC 180 determines if the first master RAC candidate has both a current firmware revision level and a good IHS operational condition indicator from among the RAC parameter 360 received from the first master RAC candidate (decision block 532).

In response to determining that the first master RAC candidate does not have both a current firmware revision level and a good IHS operational condition indicator, RAC 180 determines if any other RACs 180-228 remain on master RAC candidate list 382 (decision block 534). In response to other RACs 180-228 remaining on master RAC candidate list 382, RAC 180 increments the retry count 392 (block 536) and returns to block 524 where the RAC having the highest LOR value in the master RAC candidate list 382 is designated as a first master RAC candidate and is removed from master RAC candidate list 382. In response to no other RACs 180-228 remaining on master RAC candidate list 382, RAC 180 checks if the retry count 392 is equal to the retry count threshold 394 and if the retry count 392 is equal to the retry count threshold 394, the default master RAC 384 is identified as the master RAC candidate (block 540).

After block 540 and in response to determining that the first master RAC candidate has both a current firmware revision level and a good IHS operational condition indicator, RAC 180 transmits identifying parameters of the first master RAC candidate to the other RACs 220-228 (block 544). RAC 180 queries the other RACs 220-228 for their selections of master RAC candidates (block 546) and receives identifying parameters of the other master RAC candidates from the other RACs 220-228 (block 548). RAC 180 determines as the elected master RAC, one of the master RAC candidates that receives a highest number of selections by all of the RACs 180-228 (block 550).

At decision block 552, RAC 180 determines if master RAC has been elected. In response to a master RAC having been elected, the elected master RAC (i.e. one of RACs 180-228) transmits the identity of the elected master RAC to the other RACs (block 554). RAC 180 saves the elected master RAC as the current master RAC 374 (block 556). Method 500 then ends.

In response to a master RAC not having been elected (decision block 552), RAC 180 determines if the group retry count 378 is less than the group retry count threshold 380 (decision block 560). In response to the group retry count 378 being less than the group retry count threshold 380, RAC 180 increments the group retry count 378 (block 564) and returns to blocks 512-556 where RAC 180 tries again to determine a master RAC. In response to the group retry count 378 not being less than the group retry count threshold 380, RAC 180 selects as the current master RAC 374 the most recent master RAC 396 (block 562). RAC 180 determines if the most recent master RAC 396 is available (decision block 568). In response to the most recent master RAC 396 not being available, RAC 180 sets the group retry to zero, waits a pre-determined period of time (block 570) and returns to block 504 to continue the group election process. In response to the most recent master RAC 396 being available, method 500 ends.

Figure 6:
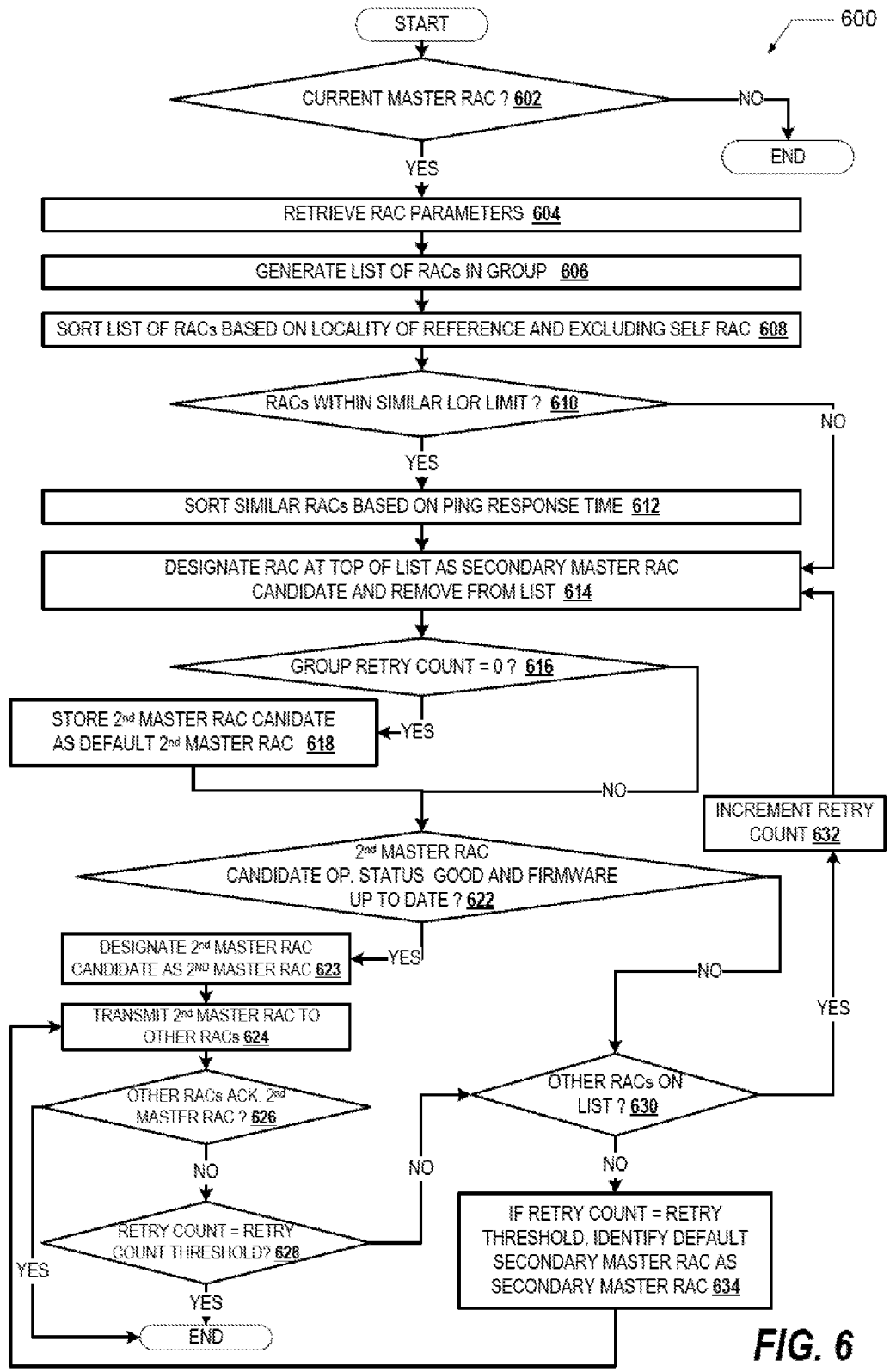
FIG. 6 is a flow chart illustrating one example of a method for determining a secondary master RAC.

FIG. 6 illustrates a method 600 for determining a secondary master RAC. In method 600, RAC 180 will be assumed to the master RAC. Referring to the flow chart of FIG. 6, method 600 begins at the start block and proceeds to decision block 602 where RAC 180 determines if there is a current master RAC 374. In response to there being no current master RAC 374, method 600 ends. In response to there being a current master RAC 374, the current master RAC (i.e. RAC 180), retrieves RAC parameters 364-372 from RAC memory 184 (block 604) and generates secondary master RAC candidate list 386 of all of the RACs in group 230 including the LOR value associated with each RAC (block 606). RAC 180 sorts the secondary master RAC candidate list 386 based on the LOR values, excluding RAC 180, at block 608.

At decision block 610, RAC 180 determines if any of the LOR values at the top of the secondary master RAC candidate list 386 are similar or are within a LOR similarity limit 398. In response to LOR values at the top of the secondary master RAC candidate list 386 being within LOR similarity limit 398, RAC 180 sorts the secondary master RAC candidate list 386 based on the ping response time (whereby a secondary master candidate having a lowest ping response time is placed highest on list) (block 612). After block 612 and in response to LOR values at the top of the secondary master RAC candidate list 386 not being within LOR similarity limit 398, RAC 180 designates the RAC at the top of the secondary master RAC candidate list 386 as the secondary master RAC candidate and removes the secondary master RAC candidate from the secondary master RAC candidate list 386 (block 614).

At decision block 616, RAC 180 determines if the group retry count is equal to zero. In response to the group retry count 378 being equal to zero, RAC 180 stores the secondary master RAC candidate as the default secondary master RAC 390 (block 618). After block 618 and in response to the group retry count 378 not being equal to zero, RAC 180 determines if the secondary master RAC candidate has both a current firmware revision level and a good IHS operational condition indicator from among the RAC parameter 360 (decision block 622).

In response to determining that the secondary master RAC candidate has both a current firmware revision level and a good IHS operational condition indicator, RAC 180 designates the secondary master RAC candidate as the current secondary master RAC 388 (block 623) and transmits identifying parameters of the current secondary master RAC 388 to the other RACs 220-228 (block 624). RAC 180 determines if a majority of the other RACs 220-228 have acknowledged the current secondary master RAC 388 (decision block 626). In response to determining that the current secondary master RAC 388 has been acknowledged by a majority of the other RACs 220-228, method 600 ends.

In response to determining that the current secondary master RAC 388 has not been acknowledged by a majority of the other RACs 220-228, RAC 180 determines if the retry count 392 is equal to the retry count threshold 394 (decision block 628). In response to the retry count 392 being equal to the retry count threshold 394, method 600 terminates. In response to the retry count 392 not being equal to the retry count threshold 394, RAC 180 determines if any other secondary master RAC candidates are on the secondary master RAC candidate list 386 (decision block 630). In response to other secondary master RAC candidates remaining on the secondary master RAC candidate list 386, RAC 180 increments retry count 392 (block 632) and returns to block 624 where RAC 180 designates the RAC at the top of the secondary master RAC candidate list 386 as the secondary master RAC candidate and removes the secondary master RAC candidate from the secondary master RAC candidate list 386.

In response to no other secondary master RAC candidates remaining on the secondary master RAC candidate list 386, RAC 180 checks if the retry count 392 is equal to the retry count threshold 394 and if the retry count 392 is equal to the retry count threshold 394, the default secondary master RAC 390 is identified as the current secondary master RAC 388 (block 540). Method 600 then returns to block 624 where RAC 180 transmits identifying parameters of the current secondary master RAC 388 to the other RACs 220-228.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method of determining a master remote access controller (RAC) in an information handling system (IHS), the method comprising:
transmitting a first set of RAC parameters from a first RAC to a plurality of other RACs, the first set of RAC parameters including a locality of reference (LOR) value for the first RAC, the LOR value being a measure of the frequency of a user access or login to the first RAC;
receiving a plurality of other sets of RAC parameters, including associated LOR values, from the plurality of other RACs;
generating a first list of all of the RACs including the associated LOR values;
sorting the first list based on the LOR values;
designating the RAC having the highest LOR value in the first list as a first master RAC candidate;
generating a second list of all of the RACs excluding the elected master RAC, the second list including the associated LOR values for each RAC on the second list;
sorting the second list based on the LOR values; and
designating the RAC having the highest LOR value on the second list as a secondary master RAC.

2. The method of claim 1, wherein the RAC parameters comprise at least one of a RAC identifier, a LOR value, a firmware revision level, an IHS operational condition indicator, and a ping response time.

3. The method of claim 1, further comprising:
determining if the first master RAC candidate has a current firmware revision level and a good IHS operational condition indicator;
in response to determining that the first master RAC candidate has a current firmware revision level and a good IHS operational condition indicator, transmitting identifying parameters of the first master RAC candidate to the other RACs;
querying the other RACs for their selections of other master RAC candidates;
receiving identifying parameters of the other master RAC candidates from the other RACs; and
determining as the elected master RAC, one of the master RAC candidates that receives a highest number of selections by all of the RACs.

4. The method of claim 3, further comprising:
identifying when the elected master RAC has been determined; and
in response to the elected master RAC having been determined, transmitting the identifying parameters of the elected master RAC to the other RACs.

5. The method of claim 3, further comprising:
identifying when the elected master RAC has been determined;
in response to the elected master RAC not having been determined, determining if a group retry count is less than a group retry count threshold;
in response to the group retry count being less than the group retry count threshold, designating a most recent master RAC as the elected master RAC; and
in response to the group retry count not being less than the group retry count threshold, incrementing the group retry count.

6. The method of claim 1, further comprising:
determining if the first master RAC candidate has a current firmware revision level and a good IHS operational condition indicator;
in response to determining that the first master RAC candidate does not have both the current firmware revision level and the good IHS operational condition indicator, determining if any other RACs remain on the first list;
in response to other RACs remaining on the first list, removing the first master RAC candidate from the first list; and
designating the next RAC on the first list as the first master RAC candidate.

7. A computer-implemented method of determining a master remote access controller (RAC) in an information handling system (IHS), the method comprising:
transmitting a first set of RAC parameters from a first RAC to a plurality of other RACs, the first set of RAC parameters including a locality of reference (LOR) value for the first RAC;
receiving a plurality of other sets of RAC parameters from the other RACs;
generating a first list of all of the RACs including the associated LOR values;
sorting the first list based on the LOR values;
designating the RAC having the highest LOR value in the first list as a first master RAC candidate
determining if the first master RAC candidate has a current firmware revision level and a good IHS operational condition indicator;
in response to determining that the first master RAC candidate does not have both the current firmware revision level and the good IHS operational condition indicator, determining if any other RACs remain on the first list; and
in response to no other RACs remaining on the first list, identifying and designating a default master RAC as the elected master RAC.

8. The method of claim 1, further comprising:
generating a second list of all of the RACs excluding the elected master RAC, the second list including the associated LOR values and a ping response time;
sorting the second list based on the LOR values; and
determining if any of the LOR values are within a similar LOR limit;
in response to determining the LOR values are within a similar LOR limit, sorting the second list based on the ping response time; and
designating the RAC having the lowest ping response time as a secondary master RAC candidate.

9. The method of claim 1, further comprising:
retrieving a current LOR value;
determining a number of logins to the first RAC for a first time period;
assigning a weight value based on the number of logins to the first RAC for the first time period;
calculating a new LOR value based on the current LOR value and the weight value; and
storing the new LOR value as the current LOR value.

10. An information handling system (IHS) comprising:
a processor, a first remote access controller (RAC) communicatively coupled to the processor, and a memory device communicatively coupled to the first RAC, the first RAC including firmware executing thereon to determine a master RAC, wherein the firmware configures the first RAC to:

transmit a first set of RAC parameters from the first RAC to a plurality of other RACs, the RAC parameters including a locality of reference (LOR) value for the first RAC, the LOR value being a measure of the frequency of a user access or login to the first RAC;

receive a plurality of other sets of RAC parameters, including associated LOR values, from the plurality of other RACs;

generate a first list of all of the RACs including the associated LOR values;

sort the first list based on the LOR values;

designating the RAC having the highest LOR value in the first list as a first master RAC candidate;

generate a second list of all of the RACs excluding the elected master RAC, the second list including the associated LOR values for each RAC on the second list;

sort the second list based on the LOR values; and designate the RAC having the highest LOR value on the second list as a secondary master RAC.

11. The information handling system of claim 10, wherein the RAC parameters comprise at least one of a RAC identifier, a LOR value, a firmware revision level, an IHS operational condition indicator and a ping response time.

12. The information handling system of claim 10, wherein the firmware further configures the first RAC to:

determine if the first master RAC candidate has a current firmware revision level and a good IHS operational condition indicator;

in response to determining that the first master RAC candidate has the current firmware revision level and the good IHS operational condition indicator, transmit identifying parameters of the first master RAC candidate to the other RACs;

query the other RACs for their selections of other master RAC candidates;

receive identifying parameters of the other master RAC candidates from the other RACs; and determine, as the elected master RAC, one of the master RAC candidates that receives a highest number of selections by all of the RACs.

13. The information handling system of claim 12, wherein the firmware further configures the first RAC to:

identify when the elected master RAC has been determined; and in response to the elected master RAC having been determined, transmit the identifying parameters of the elected master RAC to the other RACs.

14. The information handling system of claim 12, wherein the firmware further configures the first RAC to:

identify when the elected master RAC has been determined;

in response to the elected master RAC not having been determined, determine if a group retry count is less than a group retry count threshold;

in response to the group retry count being less than the group retry count threshold, designate a most recent master RAC as the elected master RAC; and in response to the group retry count not being less than the group retry count threshold, increment the group retry count.

15. The information handling system of claim 10, wherein the firmware further configures the first RAC to:

determine if the first master RAC candidate has a current firmware revision level and a good IHS operational condition indicator;

in response to determining that the first master RAC candidate does not have both the current firmware revision level and the good IHS operational condition indicator, determine if any other RACs remain on the first list;

in response to other RACs remaining on the first list, removing the first master RAC candidate from the first list; and designating the next RAC on the first list as the first master RAC candidate.

16. The information handling system of claim 10, wherein the firmware further configures the first RAC to:

determine if the first master RAC candidate has a current firmware revision level and a good IHS operational condition indicator;

in response to determining that the first master RAC candidate does not have both the current firmware revision level and the good IHS operational condition indicator, determine if any other RACs remain on the first list; and in response to no other RACs remaining on the first list, identify and designate a default master RAC as the elected master RAC.

17. The information handling system of claim 10, wherein the firmware further configures the first RAC to:

generate a second list of all of the RACs excluding the elected master RAC, the second list of including the associated LOR values and a ping response time;

sort the second list based on the LOR values; and determine if any of the LOR values are within a similar LOR limit;

in response to determining the LOR values are within a similar LOR limit, sort the second list based on the ping response time; and designate the RAC having the lowest ping response time as a secondary master RAC candidate.

18. The information handling system of claim 10, wherein the firmware further configures the first RAC to:

retrieve a current LOR value;

determine a number of logins to the first RAC for a first time period;

assign a weight value based on the number of logins to the first RAC for the first time period;

calculate a new LOR value based on the current LOR value and the weight value; and store the new LOR value as the current LOR value.

* * * * *